United States Patent
Goldstone et al.

(10) Patent No.: US 11,063,933 B2
(45) Date of Patent: Jul. 13, 2021

(54) USER AUTHENTICATION

(71) Applicant: BARCLAYS EXECUTION SERVICES LIMITED, London (GB)

(72) Inventors: Jeremy Goldstone, Manchester (GB); Dermot Dwyer, High Peak (GB)

(73) Assignee: Barclays Execution Services Limited, London (GB)

( * ) Notice: Subject to any disclaimer, the term of this patent is extended or adjusted under 35 U.S.C. 154(b) by 0 days.

(21) Appl. No.: 14/349,454

(22) PCT Filed: Sep. 25, 2012

(86) PCT No.: PCT/GB2012/052368
§ 371 (c)(1),
(2) Date: Apr. 3, 2014

(87) PCT Pub. No.: WO2013/050738
PCT Pub. Date: Apr. 11, 2013

(65) Prior Publication Data
US 2014/0250512 A1 Sep. 4, 2014

(30) Foreign Application Priority Data
Oct. 3, 2011 (GB) ................................. 1116976
Jun. 20, 2012 (GB) ................................. 1210933

(51) Int. Cl.
*H04L 29/06* (2006.01)
*H04W 12/06* (2021.01)
(Continued)

(52) U.S. Cl.
CPC ........ *H04L 63/0838* (2013.01); *G06F 21/313* (2013.01); *G06Q 20/3223* (2013.01);
(Continued)

(58) Field of Classification Search
CPC ........ H04M 3/51; H04M 3/50; H04M 3/5252; H04M 3/5253; H04M 3/5235;
(Continued)

(56) References Cited

U.S. PATENT DOCUMENTS 5,668,876 A * 9/1997 Falk .................... G06F 21/31
235/380
5,884,312 A * 3/1999 Dustan ................ H04L 63/0428
(Continued)

FOREIGN PATENT DOCUMENTS

EP 2073160 6/2009
EP 2088549 8/2009
(Continued)

OTHER PUBLICATIONS

International Preliminary Report on Patentability in International Application No. PCT/GB2012/052368 dated Apr. 3, 2014 (24 pages).
(Continued)

*Primary Examiner* — Richard A McCoy
(74) *Attorney, Agent, or Firm* — Foley & Lardner LLP

(57) ABSTRACT

User Authentication A mobile user authentication application is operable to perform one or more of the following operations: •authenticate a user in a voice call to a telephony service, by passing an authentication code to the telephony service within the voice call [FIGS. 2, 2c]; •validate a user instruction during a secure messaging session [FIG. 3]; and •authenticate a user at a physical local service by obtaining a challenge code at that local service, validating the challenge code with a remote authentication service, obtain a confirmation code from the authentication service and presenting the confirmation code for validation at the local service [FIGS. 4, 4a and 4b].

8 Claims, 10 Drawing Sheets

(51) Int. Cl.
*G06F 21/31* (2013.01)
*G06Q 20/32* (2012.01)
*G06Q 20/40* (2012.01)
*G06F 21/36* (2013.01)
*H04L 12/58* (2006.01)
*H04W 12/77* (2021.01)

(52) U.S. Cl.
CPC ..... *G06Q 20/3272* (2013.01); *G06Q 20/3276* (2013.01); *G06Q 20/4097* (2013.01); *G06Q 20/40145* (2013.01); *H04L 63/18* (2013.01); *H04W 12/06* (2013.01); *G06F 21/36* (2013.01); *G06F 2221/2115* (2013.01); *G06Q 20/3274* (2013.01); *H04L 51/04* (2013.01); *H04L 63/0853* (2013.01); *H04L 63/107* (2013.01); *H04L 63/108* (2013.01); *H04W 12/77* (2021.01)

(58) Field of Classification Search
CPC .. H04M 3/5233; H04M 3/523; H04M 3/5232; G06F 21/42; G06F 21/313
See application file for complete search history.

(56) References Cited

U.S. PATENT DOCUMENTS

| | | | | |
|---|---|---|---|---|
| 6,697,783 | B1* | 2/2004 | Brinkman | G06F 19/325 705/3 |
| 6,879,685 | B1* | 4/2005 | Peterson | G06Q 10/0639 379/265.11 |
| 7,110,393 | B1* | 9/2006 | Tripathi | H04L 29/06027 370/352 |
| 7,946,477 | B1 | 5/2011 | Ramachandran et al. | |
| 8,116,446 | B1* | 2/2012 | Kalavar | H04M 3/5232 379/265.01 |
| 9,002,750 | B1* | 4/2015 | Chu | H04L 63/0838 705/55 |
| 2001/0037463 | A1* | 11/2001 | Salta | H04L 29/06 726/28 |
| 2003/0043787 | A1* | 3/2003 | Emerson, III | H04M 7/0003 370/352 |
| 2003/0108162 | A1* | 6/2003 | Brown | H04M 1/575 379/88.01 |
| 2003/0128822 | A1 | 7/2003 | Leivo et al. | |
| 2003/0236746 | A1* | 12/2003 | Turner | G06Q 20/04 705/40 |
| 2004/0006710 | A1* | 1/2004 | Pollutro | G06F 21/31 726/28 |
| 2004/0185848 | A1* | 9/2004 | Phan-Anh | H04W 8/12 455/435.1 |
| 2005/0141694 | A1* | 6/2005 | Wengrovitz | H04M 3/5191 379/265.09 |
| 2005/0210282 | A1* | 9/2005 | Ohmori | H04L 63/1466 726/22 |
| 2006/0079203 | A1* | 4/2006 | Nicolini | H04M 3/51 455/411 |
| 2006/0256932 | A1* | 11/2006 | Bushey | G06Q 20/10 379/67.1 |
| 2006/0291642 | A1* | 12/2006 | Bushey | H04M 3/5166 379/212.01 |
| 2007/0079135 | A1 | 4/2007 | Saito | |
| 2007/0133780 | A1* | 6/2007 | Berner | H04M 3/5166 379/265.01 |
| 2007/0192601 | A1* | 8/2007 | Spain | G06F 21/31 713/168 |
| 2007/0283142 | A1* | 12/2007 | Milstein | H04L 63/08 713/155 |
| 2008/0132215 | A1* | 6/2008 | Soderstrom | H04L 12/1818 455/416 |
| 2008/0194258 | A1* | 8/2008 | Chiu | H04L 29/12188 455/435.1 |
| 2009/0025071 | A1* | 1/2009 | Mumm | G06F 21/32 726/7 |
| 2009/0052651 | A1* | 2/2009 | Iwakawa | H04M 3/567 379/212.01 |
| 2009/0119754 | A1* | 5/2009 | Schubert | H04L 63/0853 726/4 |
| 2009/0327138 | A1* | 12/2009 | Mardani | G06Q 20/10 705/64 |
| 2011/0191244 | A1 | 8/2011 | Dai | |
| 2011/0197266 | A1* | 8/2011 | Chu | H04L 9/3228 726/5 |
| 2011/0225064 | A1* | 9/2011 | Fou | G06Q 20/12 705/26.41 |
| 2012/0017081 | A1* | 1/2012 | Courtney | G06K 7/10722 713/156 |
| 2012/0148040 | A1* | 6/2012 | Desai | H04M 3/493 379/265.13 |
| 2012/0151554 | A1* | 6/2012 | Tie | H04L 63/20 726/1 |

FOREIGN PATENT DOCUMENTS

| | | |
|---|---|---|
| EP | 2128809 | 12/2009 |
| EP | 2334111 | 6/2011 |
| WO | WO02/01516 | 1/2002 |
| WO | WO03/017612 | 2/2003 |

OTHER PUBLICATIONS

International Search Report and Written Opinion in International Application No. PCT/GB2012/052368 dated May 2, 2013 (19 pages).

* cited by examiner

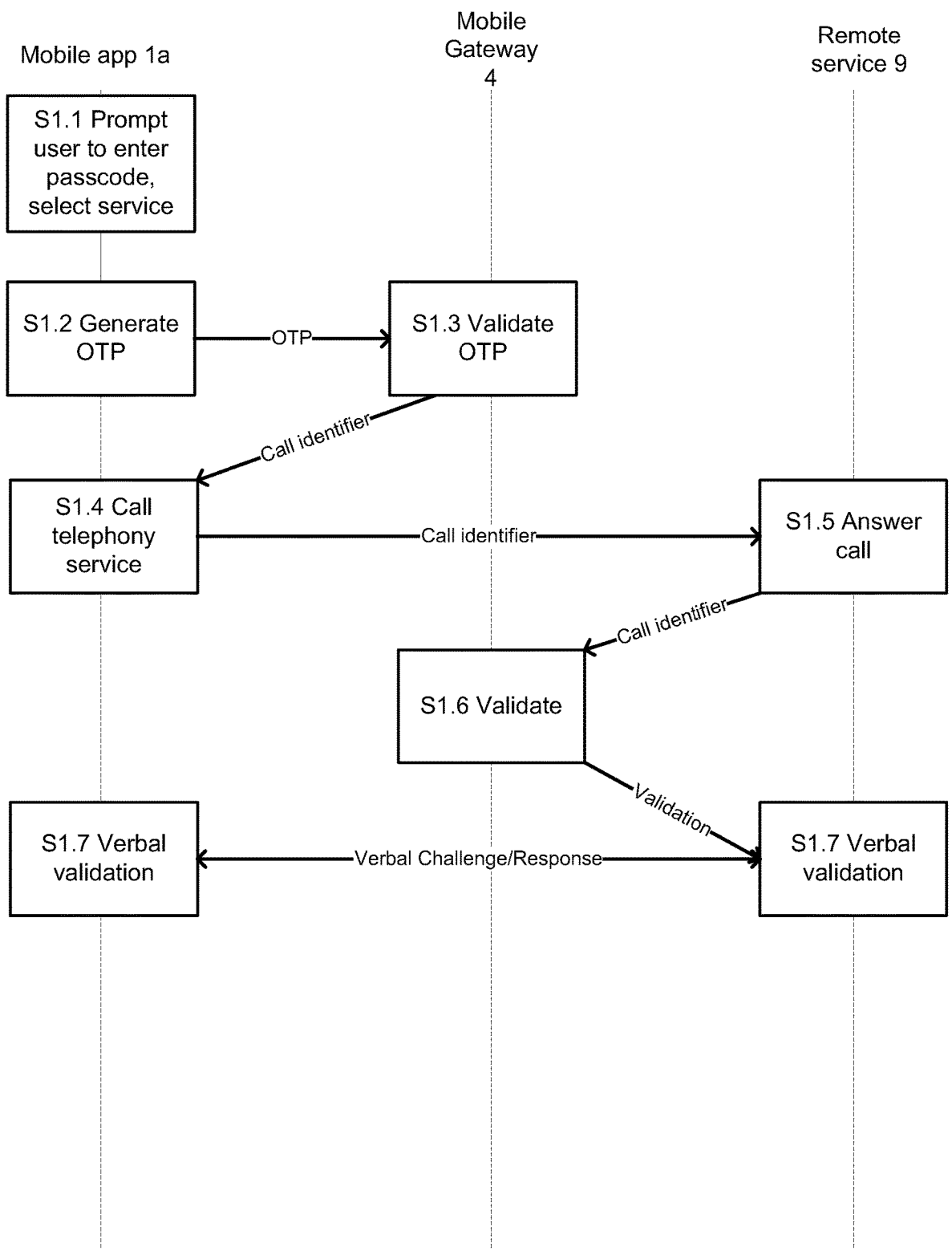

USER AUTHENTICATION

FIELD OF THE INVENTION

This invention relates to methods and systems for user authentication.

BACKGROUND OF THE INVENTION

User authentication is required in order to provide secure user access to a remote service, such as an online or telephone system, a messaging service or to a local service. However, current user authentication processes can be frustrating for the user; for example, a user requesting a service over the telephone may be required to respond to numerous requests for passcodes or personal data. These requests may be repeated when a user is passed to another operator during a call. The user may find passcodes difficult to remember, yet these passcodes are easy to intercept. Moreover, personal data for the user may be easily obtainable from various public sources.

Technical means are known for providing more secure user authentication, such as the generation of a one-time password (OTP). However, these are normally provided as stand-alone systems that are not closely integrated with the service for which the user is being authenticated.

SUMMARY OF THE INVENTION

According to one aspect of the present invention, there is provided a user authentication method in which the user is authenticated by interaction with an application at a mobile telephony device, which then initiates a voice call to the remote system and sends an authentication code to the remote system within the voice call, for example as DTMF tones, synthesized voice, or as data within a Voice-over-IP call. The remote system authenticates the user by means of the authentication code. The user's authenticated state may be maintained at the remote system as the caller is transferred between operators, or the user may be prompted to re-authenticate at the mobile device. Preferably, the authentication code is validated by a mobile gateway which acts as an authentication server or service for the mobile application and remote service.

According to another aspect of the present invention, there is provided a user authentication method in which the user is authenticated by a mobile device, which then initiates a secure messaging session with a remote operator. Within the session, the user may issue an instruction which requires additional authorisation. The remote operator then initiates an additional authorisation request, which the user validates at the mobile telephony device, so that a validated request is then sent to the remote operator.

According to another aspect of the present invention, there is provided a user authentication method at a location at which a variable challenge code is provided. A user captures the challenge code using a mobile device, the user is authenticated on the mobile device, and the mobile device sends the challenge code to a remote system for validation. If the challenge code is validated, the remote system sends a confirmation code to the mobile device, which outputs the confirmation code for capture by an operator at the location. The operator captures the confirmation code and sends the confirmation code to the remote system for validation. If the confirmation code is validated, the operator may provide a service to the user at the location, optionally having performed a further authentication with the user.

There may be provided a mobile device, a mobile gateway, and associated computer programs arranged to carry out any of the above methods. In particular the mobile gateway, an application on the mobile device and an application at the remote or local service as appropriate, which enable one or more of the above methods, are believed to be novel and inventive.

BRIEF DESCRIPTION OF THE DRAWINGS

There now follows, by way of example only, a detailed description of embodiments of the present invention, with reference to the figures identified below.

FIG. 2 is a diagram of a method of user authentication in a first embodiment of the invention.

DETAILED DESCRIPTION OF EMBODIMENTS OF THE INVENTION

Technical Architecture

Figure 1:
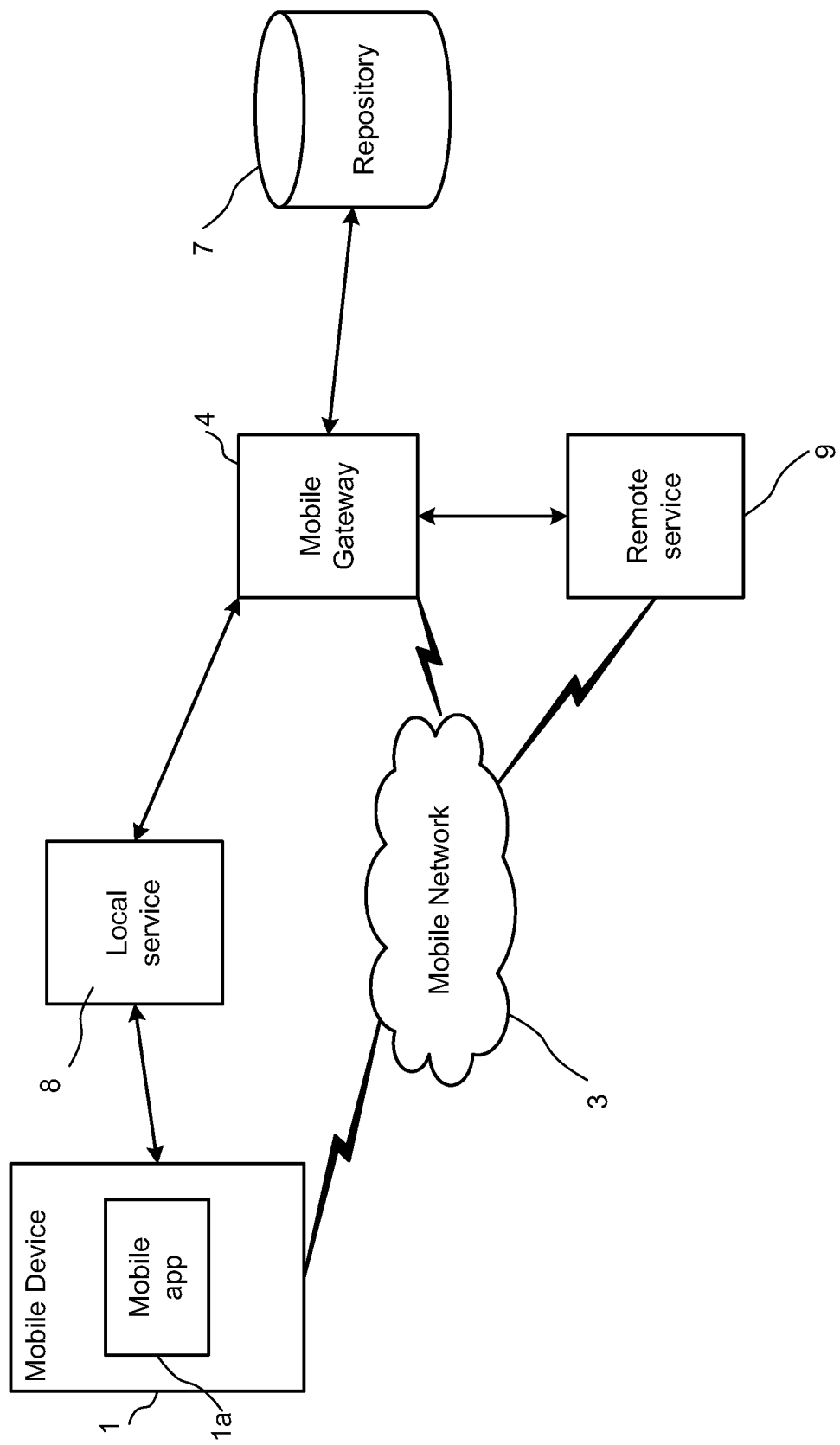
FIG. 1 is a block diagram showing the main components of a mobile user authentication system according to embodiments of the invention.

Referring to FIG. 1, a mobile authentication system according to an embodiment of the invention comprises a wireless or mobile device 1 communicating over a wireless or mobile network 3 with a mobile gateway 4 by means of a mobile application 1a. The mobile device 1 is of a type that is known per se, such as an iOS™, Blackberry™ or Android™ based smartphone. In some embodiments, the mobile device need not have a voice telephony function. The network 3 may comprise a terrestrial cellular network such as a 2G, 3G or 4G network, a private or public wireless network such as a WiFi™-based network and/or a mobile satellite network. It will be appreciated that a plurality of, and preferably a large number of mobile devices 1 are operable concurrently within the system.

The mobile gateway 4 also manages a repository 7, such as a database, including identification (ID) and registration data and status information of individual authentication sessions. The mobile application 1a is preferably registered with the mobile gateway 4 during setup of the mobile application 1a on the mobile device 1.

Registration may involve setting up one or more cryptographic keys for secure communication between the mobile application 1a and the mobile gateway 4. The key(s) may be generated from a passcode entered by the user during setup. The passcode may be a PIN, graphical passcode and/or biometric data such as a fingerprint or iris scan. The passcode may be modified by the user after setup.

Registration may also include recording the ID data in the repository 7. The ID data may pertain to the mobile device 1, the mobile application 1a and/or the user. Preferably, the ID data is associated with the mobile application 1a, but includes user data entered during provisioning.

In the specific embodiments described below, the user is required to enter the passcode as part of an authentication process. The passcode may be entered as a numeric or alphanumeric input, a graphical input such as a signature or gesture, or a biometric input. Preferably, the passcode is validated remotely, for example by generating a cryptographic key from the passcode, which key is used to sign a message sent to the mobile gateway 4. The mobile gateway 4 only responds as described in the embodiments below if the signature is validated. If not, the mobile gateway 4 may prompt the mobile application 1a to request the passcode again. The mobile gateway 4 may block access by the mobile application 1a if it presents an invalid signature more than a predetermined number of times. In this way, the authentication process is made resistant to 'brute force' attacks.

Alternatively the passcode may be validated locally against a passcode stored in a local secure area of the mobile device 1. If the passcode is validated, then the mobile application 1a is enabled to operate, for example as described in the specific embodiments below. This enablement may include access to locally stored cryptographic key(s) for secure communication with the mobile gateway 4.

In some embodiments, the mobile gateway 4 also communicates with a remote system 8, which may be a remote operator facility. In other embodiments, the mobile gateway 4 may communicate with a local system 9, which may be a branch operator facility. These communications are preferably performed over one or more secure networks.

First Embodiment

Authentication in Voice Call

FIG. 2 is a diagram of a user authentication process in a first embodiment, in which the user makes a voice call to a remote service 9, such as a telephony service, using the mobile application 1a, with the mobile gateway 4 acting as an intermediary for authentication purposes.

Figure 2A:
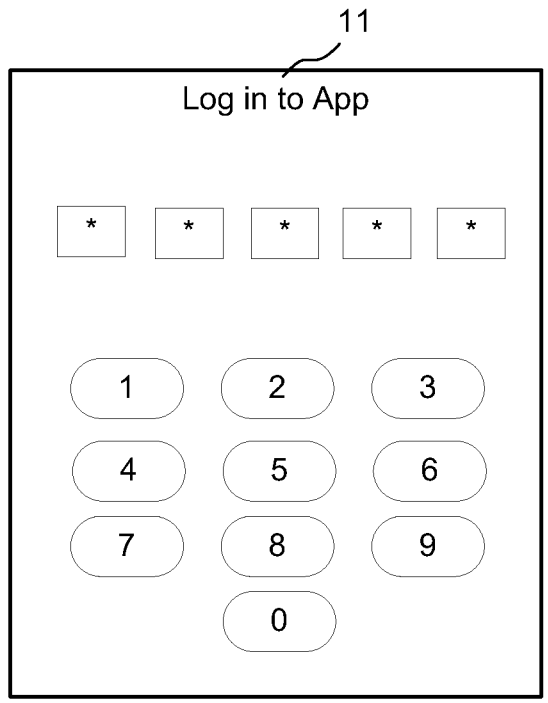
FIGS. 2a and 2b are schematic screenshots of the mobile device display, respectively during login and call type selection.

The user is first required to enter the passcode (S1.1), as described above. FIG. 2a shows an example of a suitable login display generated by the mobile application 1a.

Figure 2B:
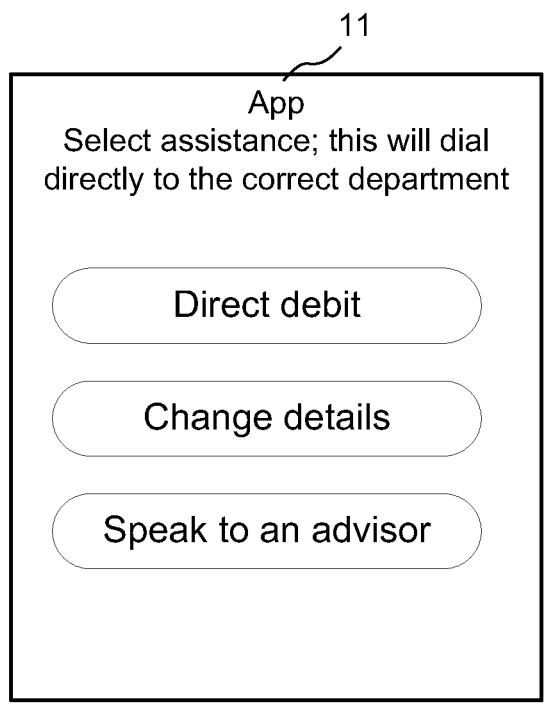

The user may then select a service within the mobile application 1a that involves an inbound voice call to the remote service 9. Optionally, the user may make a selection and/or input data relating to the purpose of the voice call. For example, as shown in FIG. 2b, the user may be presented with a menu of the purpose of the call, such as setting up or changing a direct debit instruction, changing customer details, or speaking to an advisor for some other purpose.

The mobile application 1a generates a one-time passcode (OTP) (S1.2) which is sent to the mobile gateway 4, where the OTP is validated (S1.3) and a call identifier is sent to the mobile device 1. The call identifier is variable and specific to the intended call, and may be a unique session identifier generated by the mobile gateway 4, or may comprise the OTP and ID data. The OTP and/or call identifier may be recorded against the ID data in the repository 7, for example for auditing purposes.

In response to receipt of the call identifier, the mobile application 1a initiates a voice call to the remote service 9 and, when the call has been connected to the remote service 9, passes the call identifier to the remote service 9 within the voice call. The call identifier may be encoded as an audio signal, such as DTMF (dual tone multi frequency) tones or synthesized voice, or embedded within the call so that the user is able to speak while the call identifier is being transferred. Preferably, the call identifier is a relatively short code that can be encoded in a short period of DTMF tones or voice synthesis. Alternatively, where the voice call is a Voice over IP (VoIP) call, the call identifier may be passed as non-audio data within the VoIP session.

The ID data may be included with the call identifier. Alternatively or additionally, the remote service 9 may record the Caller ID or CLI, which carries the number of the calling party, as ID data.

The remote service 9 receives the call (S1.5) and forwards the call identifier to the mobile gateway 4. Preferably, the call is answered automatically by an interactive voice response (IVR) system that is able to decode and forward the call identifier and the caller ID.

The mobile gateway 4 then validates (S1.6) the call identifier against the record previously received at step S1.3, for example by comparison with a record set up in the repository 7. If validation is successful, then the mobile gateway 4 sends a validation signal to the remote service 9.

In response to receipt of the validation signal, the remote service 9 connects the mobile device 1 to a telephone operator at the remote service 9. The telephone operator may comprise a human operator and/or an IVR instance.

Optionally, information relating to the purpose of the call, as described above, may be passed to the remote service 9; this information may be included in the OTP and call identifier, or may be sent separately to the remote service 9 at step S1.4. The remote service 9 may route the call to a selected telephone operator based on the information relating to the purpose of the call. Alternatively, at step S1.4, the mobile application 1a may call a number dependent on the purpose of the call, for example as selected from the menu shown in FIG. 2b.

Preferably, the telephone operator performs a short verbal validation (S1.7) with the user of the mobile device 1, for example by confirming customer data relating to the user, before proceeding with the call. The customer data may be obtained from the mobile gateway 4, or within the remote service 9, and presented to the telephone operator. This verbal validation may be much shorter than the conventional type of verbal validation, since the user has already been authenticated by the process described above. The customer data may also be used by the telephone operator to assist in handling the user's query.

Figure 2C:
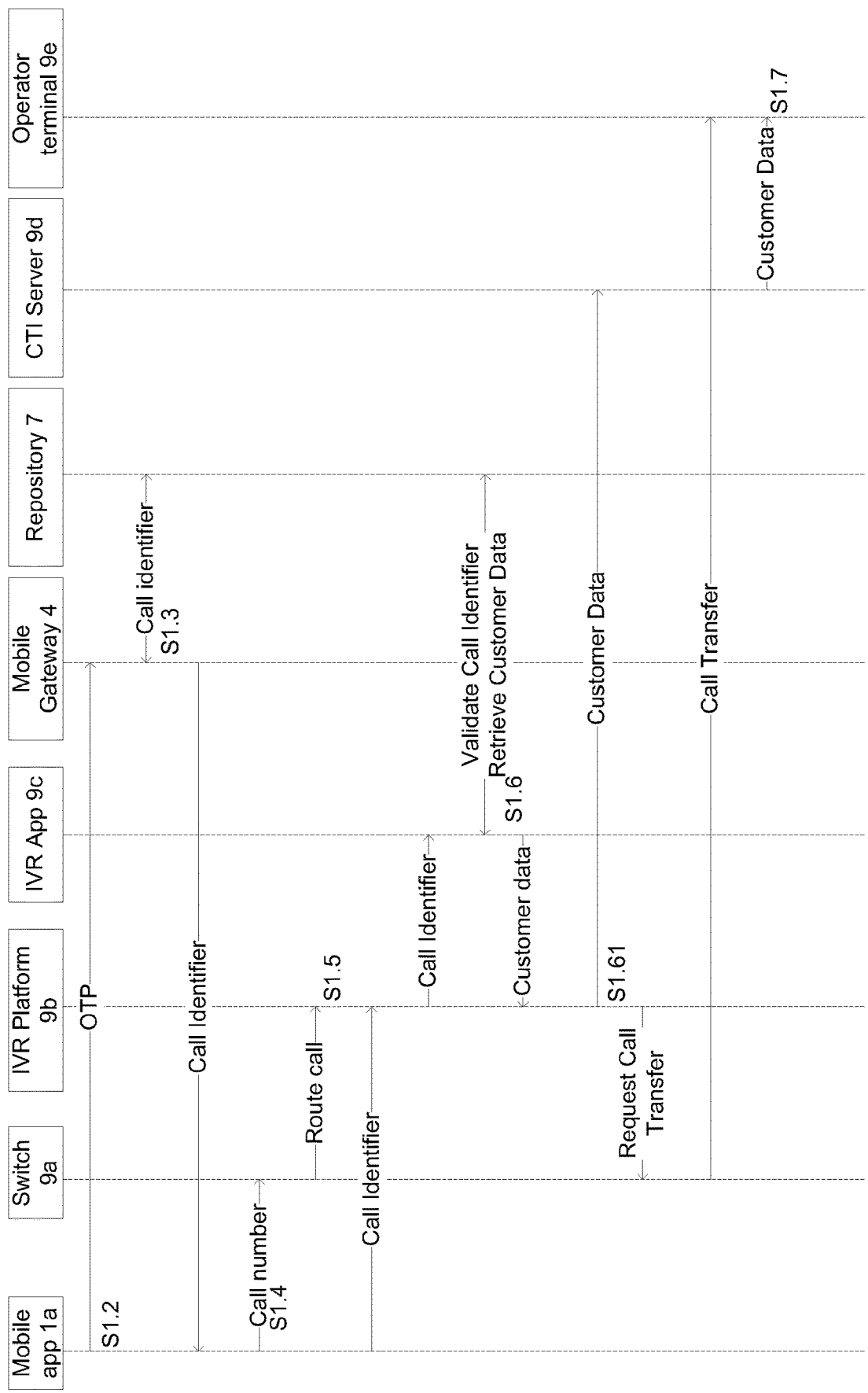
FIG. 2c is a sequence diagram of a more detailed version of the first embodiment.

FIG. 2c shows a more detailed sequence diagram of a variant of the first embodiment. In this diagram, the remote service 9 is subdivided into a telephone switch 9a or ACD (automatic call distributor), an IVR platform 9b, an IVR application 9c running on the IVR platform 9b, a CTI (computer telephony integration) server 9d, and an operator terminal 9e. The repository 7 is shown as a separate entity, connected to the mobile gateway 4. To avoid repetition of the description of the first embodiment, the same reference numerals and terms are used to indicate the same entities and steps. However, the following specific features of this variant are highlighted below.

The switch 9a routes the call to the IVR platform 9b at step S1.4 and rerouting the call from the IVR platform 9b to the operator terminal 9e after step S1.6.

The repository 7 is used to validate the OTP against customer records and to generate and store the call identifier at step S1.3. The customer data is retrieved from the repository 7 at step S1.6 and passed via the IVR platform 9*b* and the CTI server 9*d* to the operator terminal 9*e* before step S1.7.

Subsequent to step 1.7, the remote service 9 may transfer the user to another telephone operator within the call while preserving the authentication state and user identity, without requiring the user to re-authenticate. However, in some circumstances such as to confirm instructions for a transaction, it may be preferable to require the user to re-authenticate during a call, to generate a new call identifier. This may be done by sending a prompt message from the remote service 9 to the mobile application 1*a*, or the operator requesting the user to select a function in the mobile application 1*a*. The mobile application 1*a* then initiates generation and sending of a new call identifier, for example as in steps S1.1 to S1.6 above, but without clearing the current call.

Specific examples of methods of passing the call identifier from the mobile application 1*a* to the remote service 9 will now be described. In the DTMF example, the DTMF codes may be included in the dialling string used to initiate the call at step S1.4. The dialling string may include one or more pauses to allow time for the remote service 9 to answer the call before receiving the call identifier. The use of codes included within the dialling string is advantageous in environments where the mobile application 1*a* is prevented from interacting with a call, after call initiation.

In the voice synthesis example, the mobile application 1*a* waits for the call to be answered at step S1.5 before outputting the voice synthesis of the call identifier. This example is suitable for environments where interaction with initiated voice calls is permitted. Preferably, the audio is muted to the user during output of the voice synthesis of the call identifier.

In the VoIP example, the call identifier may be passed to the remote service 9 within the VoIP protocol, before the voice call is initiated. This example is generally compatible with VoIP applications.

Second Embodiment

Instruction Validation in Secure Messaging Session

Figure 3:
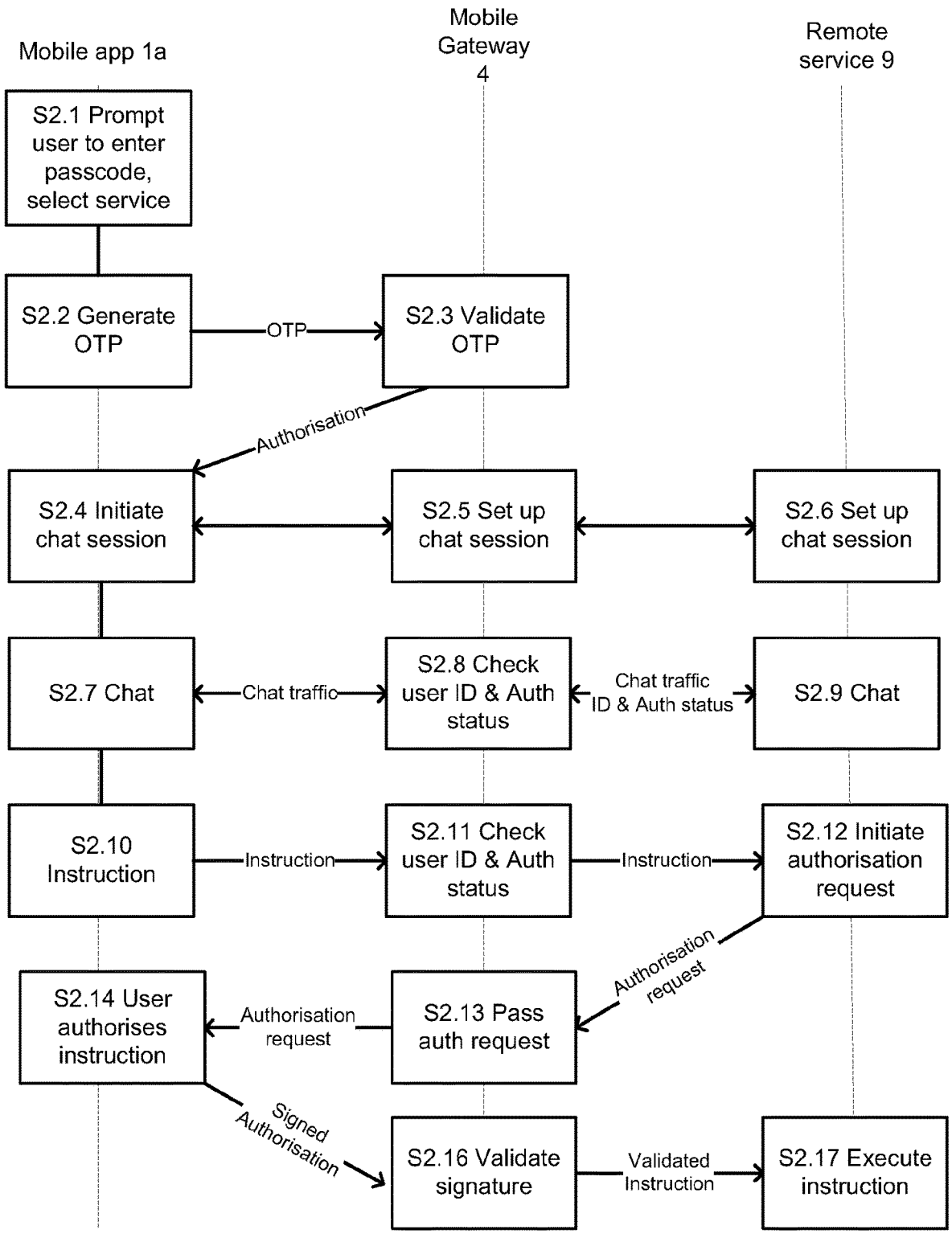
FIG. 3 is a diagram of a method of user authentication in a second embodiment of the invention.

FIG. 3 is a diagram of a user authentication process in a second embodiment, in which the user initiates a secure messaging session to a remote service 9 using the mobile application 1*a*, with the mobile gateway 4 acting as an intermediary for authentication purposes. The remote service 9 may request validation of user instructions within the secure messaging session.

The user is first required to enter the passcode (S2.1). The user may then select, within the mobile application 1*a*, a secure chat session with the remote service 9.

The mobile application 1*a* generates a one-time passcode (OTP) (S2.2) which is sent to the mobile gateway 4, where the OTP is validated (S2.3). Validation may include recording the OTP against the relevant ID data in the repository 7.

The mobile gateway then sends an authorisation signal to the mobile application 1*a*, authorising the mobile application 1*a* to initiate (S2.4) a secure messaging or 'chat' session through the mobile gateway (S2.5) to the remote service (S2.6). The user may then exchange chat messages (S2.7) through the mobile gateway 4 (S2.8) to an operator at the remote service 9 (S2.9). The mobile gateway 4 validates the user identity and the authorisation status of the messaging session before passing messages.

In this context, the messaging or chat session involves the bidirectional exchange of alphanumeric (text-based) messages between two parties (the user and the remote operator) within a session. The messages may be passed between the two parties substantially instantly, in real time. The messages are preferably encrypted, for example using a key established during session set-up (steps S2.4 to S2.6). The remote operator may be a human operator or may be a computer program (e.g. a 'chat-bot' trained to respond appropriately to frequently asked questions, for example).

Within the messaging session, the user may send a message including an instruction (step S2.10), which requires the operator to perform an action. This message is passed through the mobile gateway 4 (step 2.11) to the remote service 9, in the same way as any other chat message within the session. However the operator, in response to receipt of the instruction and identification that an action is required, initiates an authorisation request (step 2.12), to obtain confirmation that the instruction is authorised by the user. An authorisation request is sent through the mobile gateway 4 (S2.13) to the mobile application, including details of the action to be authorised.

In response to receipt of the authorisation request, the mobile application displays the received details of the action to be authorised, and requests the user to enter a passcode to confirm the instruction (S2.14). The passcode may the same as used in step S2.1, or a different passcode.

The mobile application 1*a* applies a cryptographic signature, for example based on the passcode, to the details of the authorised action, and sends the signed authorisation to the mobile gateway 4, which validates (S2.16) the cryptographic signature against the details sent to the mobile application 1*a* at step S2.13. If this validation is successful, the mobile gateway 4 sends the validated instruction details to the remote service 9, including a validation message. Alternatively, the signature may be validated directly with the remote service 9, without involvement of the mobile gateway 4.

In response to receipt of the validated instruction details, the operator at the remote service 9 carries out the instruction (S2.17), and may optionally send a confirmation message to the user within the messaging session.

In one example, the instruction may relate to a money transfer of a specified value to a specified account, and the execution of the instruction involves initiation of the money transfer through a computerised banking system. However, the present embodiment is not limited to banking or financial applications, but relates to telecommunication between remote parties, with an authentication and authorisation function.

Third Embodiment

Authentication with Local Service

Figure 4:
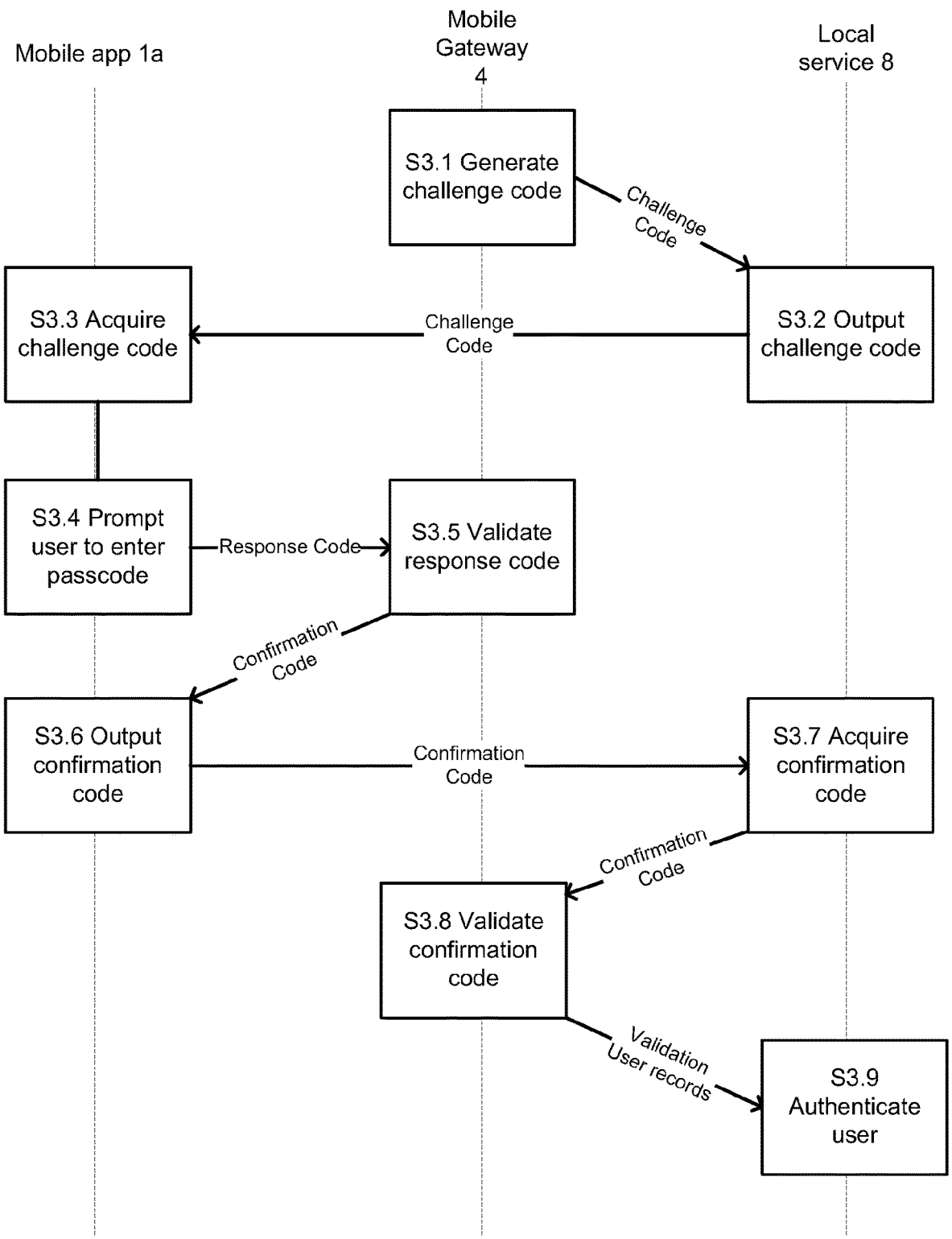
FIG. 4 is a diagram of a method of user authentication in a third embodiment of the invention.

FIG. 4 is a diagram of a user authentication process in a third embodiment, in which the user is authenticated with a local service 8 using the mobile application 1*a*, with the mobile gateway 4 acting as an authentication service.

The mobile application 1*a* interacts with the local service 8 through one or more local and/or direct means, such as machine-accessible codes. These codes may comprise one- or two-dimensional barcodes, preferably Quick Response (QR) two-dimensional barcodes. Alternatively, the codes may comprise audio codes, optionally embedded in other audio content. In another alternative, the codes may be sent over one or more short-range wireless links, such as NFC (near-field communication) links.

The mobile gateway 4 generates a variable challenge code (S3.1), which is transmitted to the local service 8. The challenge code preferably varies with time. In applications where there are a plurality of local services 8 at different physical locations, the challenge code preferably varies with each local service 8 and is therefore indicative of the location of the local service. The local service 8 outputs the challenge code (S3.2) in a machine-accessible form, such as a barcode or QR code. The challenge code is generated independently of any specific user authentication session, and is provided for capture by any user wishing to be authenticated. The challenge code may be generated independently of the mobile gateway 4, from information that is verifiable by the mobile gateway 4.

A user wishing to be authenticated to the local service 8 uses the mobile application 1*a* to capture the challenge code (S3.3), and enters the passcode (S3.4) to log in to the mobile application 1*a*, in either order. The mobile application 1*a* generates a response code, based on the challenge code and preferably identifying the mobile device 1 and/or the mobile application 1*a*.

The mobile application 1*a* then sends the response code to the mobile gateway 4, for example by initiating a call to the mobile gateway 4, and passing the response code within the call, for example as a DTMF string. Other methods may be used, such as data transfer via an Internet connection, or a text message.

Validation may include checking that the response code is based on a challenge code generated and sent to the local service 8 within a predetermined time window prior to receipt of the response code from the mobile application 1*a*. Validation may also include checking that the mobile application 1*a* is authorised to use the authentication service.

In response to successful validation, the mobile gateway 4 generates a confirmation code derived from the response code and sends the confirmation code to the mobile application 1*a*, which outputs the confirmation code (S3.6) in a machine-accessible form. The local service 8 captures the confirmation code (S3.7) and sends the confirmation code, or another code based on the confirmation code, to the mobile gateway 4.

The mobile gateway 4 then validates the confirmation code (S3.8), so as to confirm that the user has been successfully authenticated in the process described above. Validation may include checking that the confirmation code corresponds to a challenge code that was previously sent to the local service 8 at step S3.1. Validation may also include checking that the confirmation code was sent to the mobile application 1*a* previously at step S3.5 within a predetermined time window.

In response to successful validation, the mobile gateway 4 sends a validation message to the local service 8, preferably including one or more user records retrieved from the repository 7. The local service 8 may further authenticate the user by asking the user to provide user information and checking this against the one or more user records. The local service 8 may then carry out a service for the user.

The challenge code, response code and/or the confirmation code are preferably encrypted, secured, and/or cryptographically signed, to prevent spoofing of the codes or interception of information contained within them. For example, the challenge code may include a secure hash so as to prevent generation of false challenge codes. The response code may be signed by the mobile application 1*a*. The confirmation code may be signed by the mobile gateway 4, may be further signed by the mobile application 1*a* before output to the local service 8 and/or may be signed by the local service 8 before transmission to the mobile gateway 4. The communications with the mobile gateway 4 may be via a secure channel.

Figure 4A:
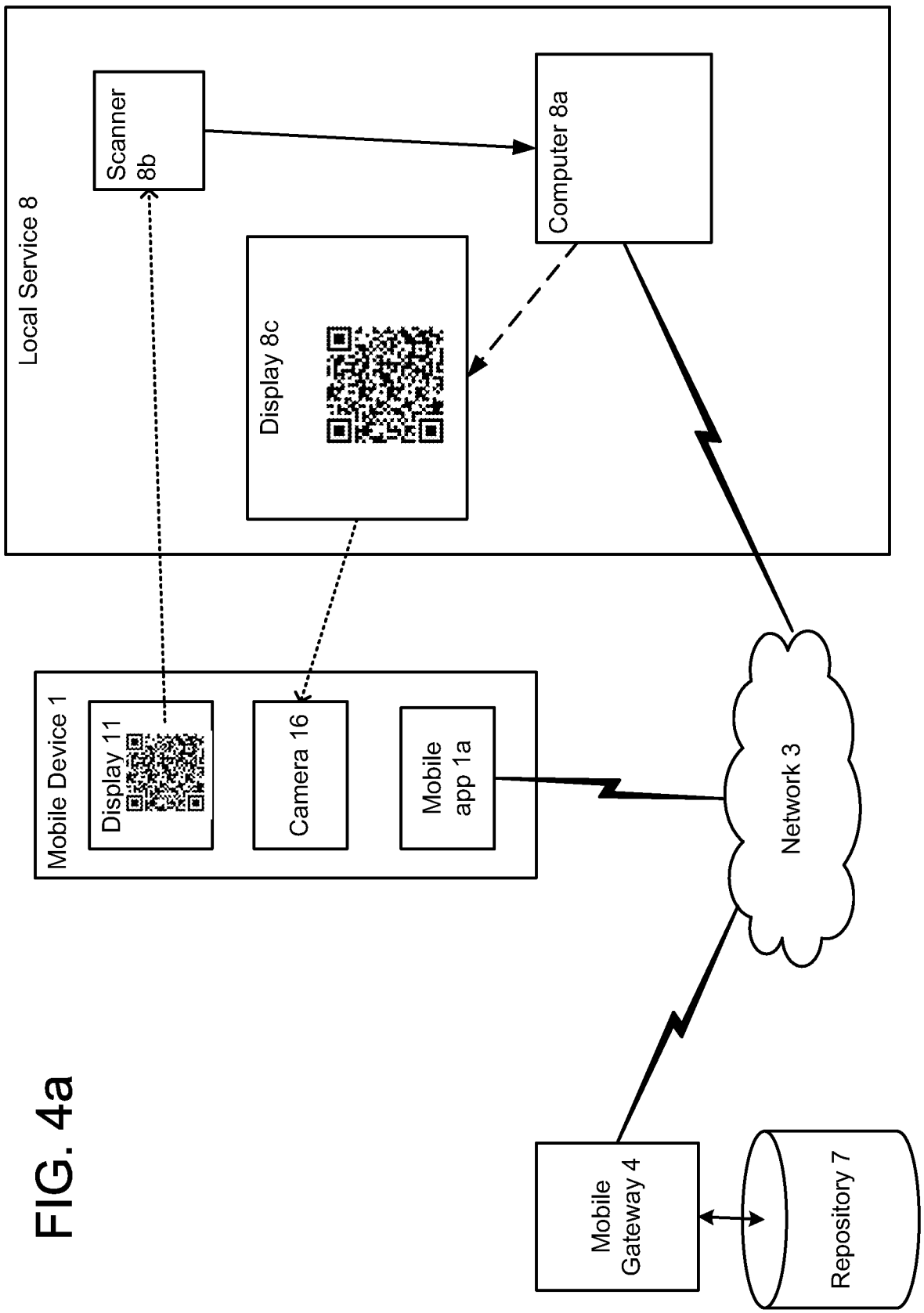
FIG. 4a is a diagram of a user authentication system in a more detailed version of the third embodiment.
Figure 4B:
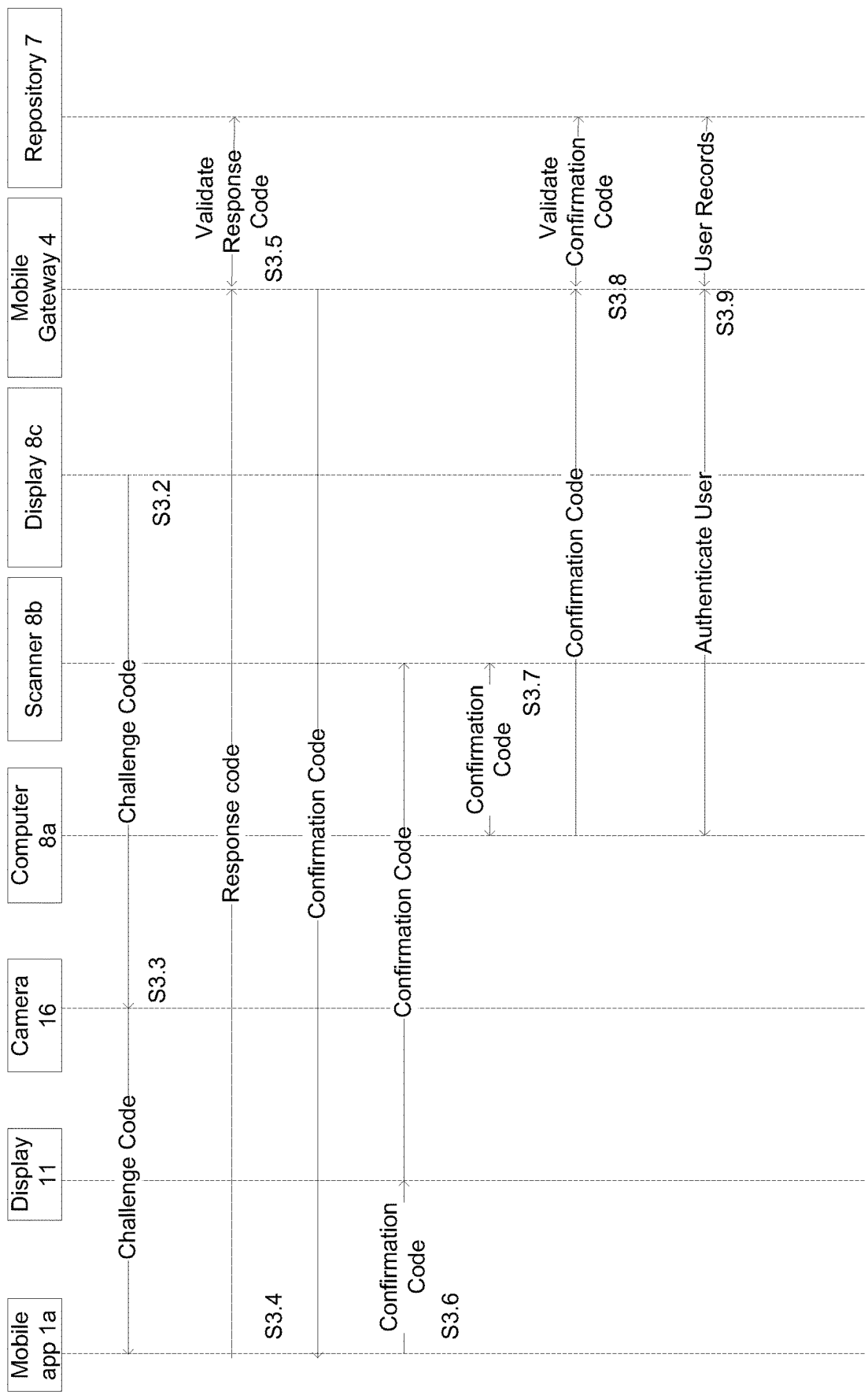
FIG. 4b is a sequence diagram of the more detailed version of the third embodiment.

In one specific example of the third embodiment, as illustrated in FIGS. 4*a* and 4*b*, the local service 8 is located at a branch of a bank. There may be a plurality of such local services, each located at a corresponding local branch of the bank.

The local service comprises at least a computer 8*a*, connected to a scanner 8*b* for scanning the confirmation code, and a display 8*c* for displaying the challenge code. The computer 8*a* is connectable to the mobile gateway 4 via a network, such as the network 3. In a first example, the computer 8*a* is a counter service computer operable by a counter service operator, and the scanner 8*b* may be a scanning device located at the counter, such as a handheld scanner. In a second example, the computer 8*a* and the scanner 8*b* form part of an automated kiosk for providing services, the kiosk including a user interface for providing services to the user via the computer 8*a*. In a third example, the computer 8*a* is a portable device and the scanner 8*b* is a camera integrated within the portable device. The portable device may run an authentication application for use by staff at the local branch. The portable device may be a smartphone, PDA or the like.

The display 8*c* may be connected to the computer 8*a*, or to another computer connectable to the mobile gateway 4. In one variant, the display 8*c* may be a thin client of the mobile gateway 4, such as an Internet-enabled TV connected to a web or image server of the mobile gateway 4. In another variant, the display 8*c* may comprise a printed display, preferably one that is updated periodically. The display 8*c* is preferably accessible to any user in or around the local branch; for example, the display may be visible through a window of the local branch, or may be accessible on entry to the local branch.

At step S3.2, the challenge code is displayed on the display 8*c*, and at step S3.3 the user scans the challenge code using a camera 16 on the mobile device 1.

There may be more than one challenge code displayed concurrently or sequentially on the display 8*c*, with each challenge code corresponding to a different required service and having associated human readable information indicating the corresponding service. For example, there may be one challenge code for loan applications, another for account queries, and so on. The user scans the challenge code corresponding to the required service, and the confirmation code generated at step S3.5 may then include information identifying the required service.

At step S3.6, the confirmation code is displayed by the mobile app 1*a* on the mobile display 11, and at step S3.7, the confirmation code is scanned with the scanner 8*b*. The confirmation code generated at step S3.5 may include security features limiting the use of the confirmation code to a particular time and/or location. In one example, the confirmation code may include a reference to the local service 8 at which the corresponding challenge code was displayed, and the confirmation code may be rejected if scanned by any other local service 8. Alternatively or additionally, the confirmation code may include a reference to a validity period, such as the current date or a time window within that date, and the confirmation code may be rejected if the validity period does not match the time or date of scanning by the local service. If the challenge code is rejected, the local service 8 does not need to proceed to step S3.8. The time and/or location reference may be derived from the challenge code, via the response code, or alternatively from the time and/or location of the mobile device when the response code was sent, for example using location and/or time information provided by the mobile device.

When presenting the confirmation code, the user may also provide personal data, such as a postcode or date of birth, and this personal data may be sent with the confirmation code to the mobile gateway for validation at step 3.8. This helps to prevent fraud by opportunistic interception of the confirmation code, for example by theft of the mobile device 1 or photographing the confirmation code from the mobile device.

At step S3.9, user authentication takes place using the one or more user records (e.g. customer data) sent by the mobile gateway 4 at step S3.8, so that the user can be authenticated against the corresponding records, for example by requiring the user to provide personal details and/or a passcode. This additional step helps to prevent fraud e.g. by theft of the mobile device 1.

In an alternative embodiment, for users who do not have a mobile device 1, a member of staff may first authenticate the user, for example using paper documents and/or a bank card belonging to the user. The staff member may then obtain a challenge code from the display 8c or directly from the computer 8a, and may then perform steps S3.5 and S3.6 on behalf on the user. The confirmation code may be printed out and handed to the user, who then presents the printed code at step S3.7. Hence, a manual authentication service may be performed prior to the service required by the user, which may result in more efficient operation of a local branch. The member of staff authenticating the user may also discover the type of service required by the user, and may then communicate this information as part of the challenge code. Hence, the manual authentication service may provide a type of triage for banking customers.

An advantage of the detailed embodiment above is that the challenge code may be validated while the user is waiting to be served. The local service 8 may also be informed of which users are waiting to be served, for example by an additional step of sending a report from the mobile gateway 4 to the local service 8. This report may include an indication of the services required by the user(s), as identified above.

The local service 8, such as the computer 8a, may then send a status message to the user, for example by sending a message to the user's mobile device 1, either within the mobile application 1a or via a separate messaging application, such as an SMS or text message; the status message may be a confirmation that the challenge code has been received and validated, a personalised waiting time, notification that the user can now be served and so on. Alternatively or additionally, the message may be displayed on a display forming part of the local service; for example, the surname or a codeword for the next customer to be served may be displayed on the display 8c or another display generally visible to customers, so that the customer does not need to check their mobile device 1.

The local service 8 may additionally or alternatively make preparations for specific requirements of the users who are waiting to be served, for example as identified by the challenge code selected by the user.

The local service 8 may prioritise or manage specific users of the system described above, based for example on the corresponding user records or the service required. In one example, a user requesting a specific service may be directed to a specific counter or kiosk dedicated to that service. In another example, a user requiring a quick service may be prioritised ahead of a user requiring a lengthy service. This information may be communicated to the user by the status message.

Mobile Device Details

Figure 5:
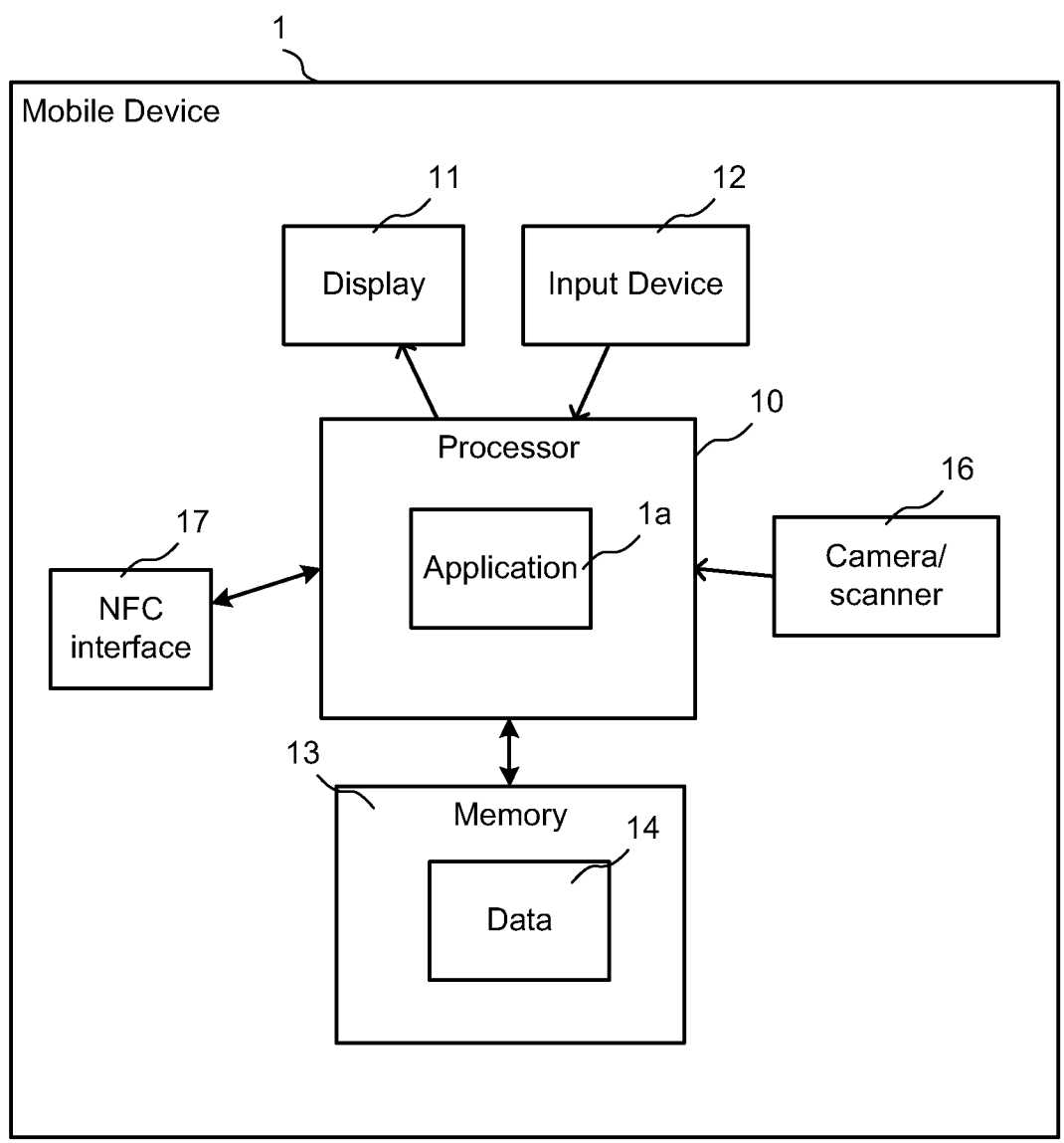
FIG. 5 is a diagram showing details of a mobile device for use in embodiments of the invention.

FIG. 5 shows further details of one example of the mobile device 1, comprising at least a processor 10, including for example hardware and an application platform, running the application 1a, and connected to memory 13 storing local data 14. The application platform may be a mobile operating system such as iOS™, Android™ or Blackberry OS. The application 1a may comprise program code, which can be loaded or downloaded onto the mobile device 1.

The mobile device 1 has a display 11 and a manual input device 12, which may be integrated with the display as a touchscreen, and/or provided as a keypad. An alternative or additional input device may be used, such as a trackball, trackpad, motion sensor or mouse. The mobile device 1 may include a camera or scanner 16 for capturing optical images and/or codes.

The mobile device 1 includes a network interface 15 to the wireless or mobile network 3. The mobile device 1 may also include an NFC interface 17.

Computer Details

Figure 6:
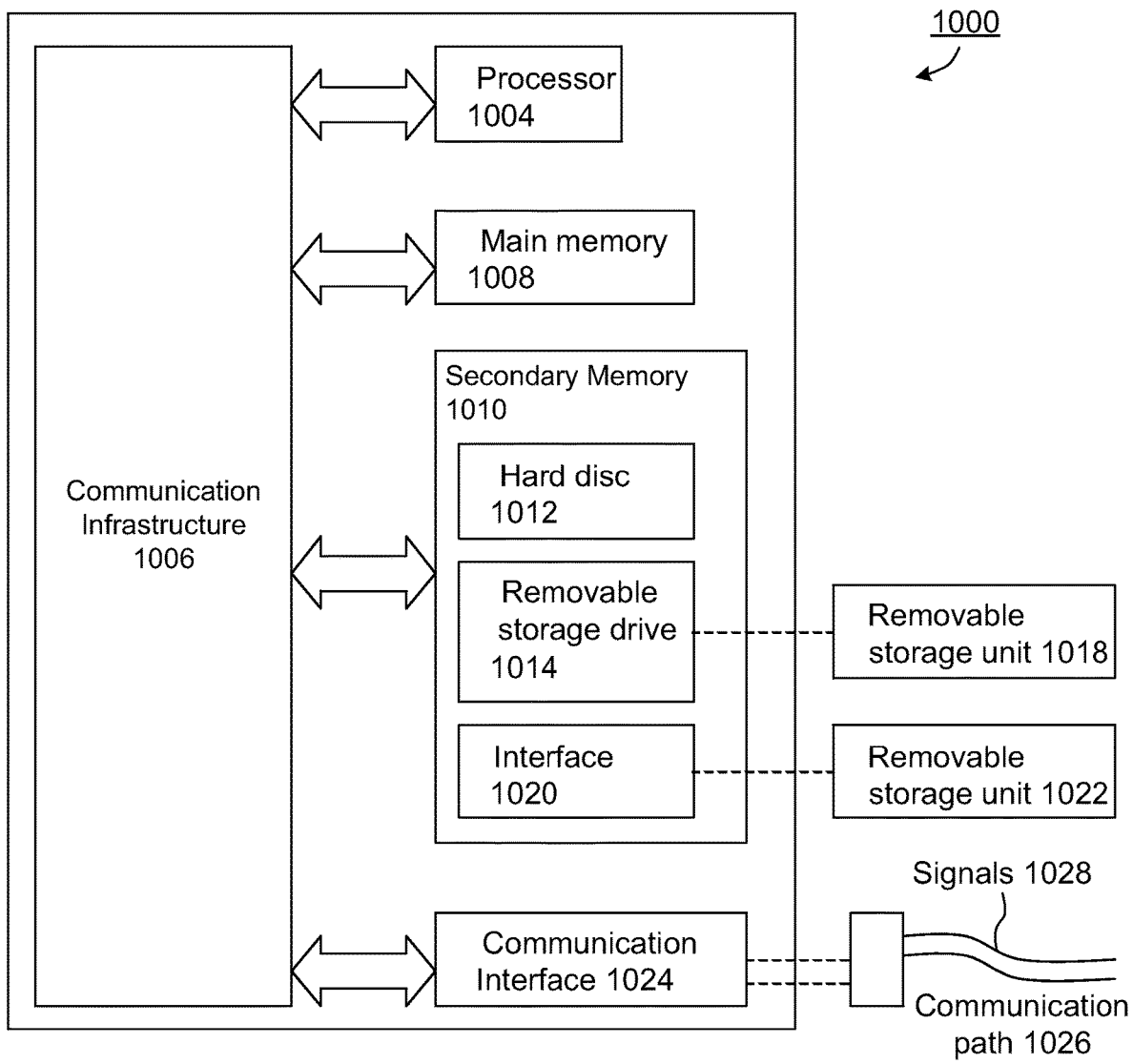
FIG. 6 is a diagram showing details of a computer system for use in embodiments of the invention.

The mobile gateway 4, local service 8 and/or remote service 9 herein may be implemented by computer systems such as computer system 1000 as shown in FIG. 6. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

ALTERNATIVE EMBODIMENTS

Embodiments of the invention are not limited to banking or financial applications, but relate in general to the technical field of electronic communication between computer entities, with an authentication function.

In the above embodiments, the mobile gateway 4 acts as an authentication server or service separate from the remote or local service 8, 9. Alternatively, some or all of the functions of the mobile gateway 4 may be integrated with the remote or local service 8, 9.

The above embodiments are described by way of example, and alternative embodiments which may become apparent to the skilled person on reading the above description may nevertheless fall within the scope of the claims.

The invention claimed is:

1. A method of user authentication by an application on a mobile telephony device, the method comprising the following steps executed by the application:
   prior to initiating a telephone call to a remote telephony service, receiving authentication information from a user;
   sending the authentication information to a remote authentication service;
   when the authentication service identifies the user using the authentication information, receiving an authentication status from the authentication service including a call identifier, wherein the call identifier is a unique session identifier or includes a one-time passcode;
   receiving separate data input by the user that identifies a purpose of the telephone call;
   appending the separate data to the call identifier;
   initiating the telephone call to a remote telephony service;
   sending the call identifier with the appended separate data to the remote telephony service after the telephone call has been connected to the remote telephony service; and
   after determining an authentication comparison match between the unique session identifier or the one-time passcode received in the initiated telephone call and an expected session identifier or an expected one-time passcode, the expected session identifier or the expected one-time passcode: (1) determined by the remote authentication service in response to the identification of the user using the authentication information, and (2) subsequently saved in a repository, receiving communications via the initiated telephone call from a telephone operator specific to the purpose of the telephone call and determined by routing the telephone call according to the appended separate data,
   wherein the authentication comparison match is determined by the remote telephony service and verifies that the initiated telephone call was made by the user.

2. The method of claim 1, wherein the user is verified by verbal validation within the telephone call.

3. The method of claim 2, wherein the verbal validation comprises confirming data relating to the user.

4. The method of claim 3, wherein the data relating to the user is confirmed by the remote authentication service.

5. The method of claim 1, wherein the user is authenticated locally at the mobile telephony device by the interaction with the application, to receive the call identifier from the remote authentication service.

6. The method of claim 1, wherein the call identifier is included as an audio signal within the telephone call.

7. A mobile device system for user authentication, the mobile device system comprising:
   a processor;
   a memory coupled to the processor; and
   an application stored on the memory and executed by the processor, wherein the application is arranged to:
   prior to initiating a telephone call to a remote telephony service, receive authentication information from a user;
   send the authentication information to a remote authentication service;
   when the authentication service identifies the user using the authentication information, receive an authentication status from the authentication service including a call identifier, wherein the call identifier is a unique session identifier or includes a one-time passcode;

receive separate data input by the user that identifies a purpose of the telephone call;
append the separate data to the call identifier;
initiate the telephone call to a remote telephony service;
send the call identifier with the appended separate data to the remote telephony service, after the telephone call has been connected to the remote telephony service; and
after determining an authentication comparison match between the unique session identifier or the one-time passcode received in the initiated telephone call and an expected session identifier or an expected one-time passcode, the expected session identifier or the expected one-time passcode: (1) determined by the remote authentication service in response to the identification of the user using the authentication information, and (2) subsequently saved in a repository, receive communications via the initiated telephone call from a telephone operator specific to the purpose of the telephone call and determined by routing the telephone call according to the appended separate data,
wherein the authentication comparison match is determined by the remote telephony service and verifies that the initiated telephone call was made by the user.

8. The method of claim 1, wherein the user provides the separate data identifying the purpose of the telephone call without receiving any requests from the telephony service.

* * * * *